US006981038B2

(12) United States Patent
McKenzie et al.

(10) Patent No.: US 6,981,038 B2
(45) Date of Patent: Dec. 27, 2005

(54) METHODS, SYSTEMS AND COMPUTER PROGRAM PRODUCTS FOR DETERMINING SIMPLE NETWORK MANAGEMENT PROTOCOL (SNMP) OBJECT IDENTIFIERS IN A MANAGEMENT INFORMATION BASE (MIB) FILE

(75) Inventors: Douglas Evans McKenzie, Dunstable, MA (US); Rex Armistead White, Raleigh, NC (US); James Horan Carey, Acton, MA (US)

(73) Assignee: International Business Machines Corporation, Armonk, NJ (US)

( * ) Notice: Subject to any disclaimer, the term of this patent is extended or adjusted under 35 U.S.C. 154(b) by 919 days.

(21) Appl. No.: 09/768,086

(22) Filed: Jan. 23, 2001

(65) Prior Publication Data

US 2002/0097721 A1 Jul. 25, 2002

(51) Int. Cl.[7] .......................................... G06F 15/173
(52) U.S. Cl. ...................... 709/223; 709/224; 709/230; 709/213; 707/103 Y
(58) Field of Search ................................ 709/223, 224, 709/225, 203, 230, 213, 217–219; 707/103 Y (56) References Cited

U.S. PATENT DOCUMENTS

| | | | | |
|---|---|---|---|---|
| 5,185,860 A | | 2/1993 | Wu ............................. 395/200 |
| 5,337,360 A | * | 8/1994 | Fischer ........................ 713/176 |
| 5,636,216 A | | 6/1997 | Fox et al. .................... 370/402 |
| 5,651,006 A | * | 7/1997 | Fujino et al. ................ 370/408 |
| 5,737,518 A | * | 4/1998 | Grover et al. ................. 714/38 |
| 5,793,763 A | | 8/1998 | Mayes et al. ................ 370/389 |
| 5,864,865 A | * | 1/1999 | Lakis ....................... 707/103 R |
| 5,884,246 A | | 3/1999 | Boucher et al. ................ 704/2 |
| 6,026,397 A | * | 2/2000 | Sheppard ........................ 707/5 |
| 6,028,848 A | | 2/2000 | Bhatia et al. ................ 370/257 |
| 6,038,233 A | | 3/2000 | Hamamoto et al. .......... 370/401 |
| 6,055,236 A | | 4/2000 | Nessett et al. ............... 370/389 |
| 6,058,431 A | | 5/2000 | Srisuresh et al. ............ 709/245 |
| 6,061,349 A | | 5/2000 | Coile et al. .................. 370/389 |
| 6,332,142 B1 | * | 12/2001 | LeBlanc ...................... 707/100 |
| 6,360,258 B1 | * | 3/2002 | LeBlanc ...................... 709/223 |
| 6,484,257 B1 | * | 11/2002 | Ellis ............................ 713/153 |
| 6,532,491 B1 | * | 3/2003 | Lakis et al. ................. 709/223 |
| 2001/0052006 A1 | * | 12/2001 | Barker et al. ................ 709/223 |

OTHER PUBLICATIONS

Network Working Group, RFC 2578, K. McCloghrie et al, Apr. 1999, http://ietf.org/rfc/rfc2578.txt?number=2578; Structure of Management Information Version 2.*
Rose, et al. *RFC 1065*, May 1990.
Case et al., *RFC 1098*, May 1990.
McCloghrie et al., *RFC 1158*, May 1991.

* cited by examiner

*Primary Examiner*—Saleh Najjar
*Assistant Examiner*—Benjamin R. Bruckart
(74) *Attorney, Agent, or Firm*—Myers Bigel Sibley & Sajovec, P.A.

(57) ABSTRACT

Methods, systems and computer program products are provided for automatically determining Simple Network Management Protocol (SNMP) object identifiers in a Management Information Base (MIB) file that identify Internet Protocol (IP) addresses. An intermediate file may be created that is a representation of the MIB file and contains attribute specific information including the SNMP object identifier for each attribute. All the SNMP object identifiers contained in the intermediate file that identify relevant attribute types may be determined. An output file containing the SNMP object identifiers determined to identify relevant attribute types may be generated. The output file may also be consumable by a Comprehensive Network Address Translator (CNAT) product.

45 Claims, 6 Drawing Sheets

METHODS, SYSTEMS AND COMPUTER PROGRAM PRODUCTS FOR DETERMINING SIMPLE NETWORK MANAGEMENT PROTOCOL (SNMP) OBJECT IDENTIFIERS IN A MANAGEMENT INFORMATION BASE (MIB) FILE

BACKGROUND OF THE INVENTION

The present invention relates to the field of communications in general and more particularly to the evaluation of Simple Network Management Protocol (SNMP) object identifiers in a Management Information Base (MIB) file.

Network Address Translation (NAT) is a widely used technology for allowing traffic to flow between two discrete Transport Control Protocol/Internet Protocol (TCP/IP) networks without address conflicts. The traditional NAT function translates the source and/or destination IP addresses in the header portion of IP packets as they cross the NAT threshold, so that data packets originating in one network are mapped into unique addresses as they cross into the other network. This basic technology is suitable for some types of network traffic, but is not sufficient for the needs of network management platforms, which often use additional address information contained within the data portion of IP packets for discovery and topology functions.

The Tivoli Comprehensive Network Address Translator (CNAT) has the capability of modifying the actual payloads of specific network management messages, enabling network management across networks that have conflicting or out-of-range IP addresses. Tivoli CNAT monitors data packets coming through the machine and enables management of conflicting IP address ranges by mapping conflicting addresses into available addresses within the service provider's network. For all data packets routed through the system, CNAT checks the source and destination IP addresses and translates any conflicting addresses to ensure that no conflicts will occur in the destination network.

In addition, Tivoli CNAT also performs translation on Internet Control Message Protocol (ICMP) and SNMP data packets. All values associated with IP addresses are typically translated within the data packets before they are forwarded on to their destination. The translation of IP addresses in SNMP data packets typically requires specific identification of each instance of the IP addresses. These IP addresses each typically have a unique SNMP Object Identifier located within a Management Information Base (MIB) which is used to identify each IP address. Accurate identification of all translatable instances of IP addresses within a MIB may be useful in supporting the Tivoli CNAT product or other such address translator mechanisms. Furthermore, manual scanning of SNMP MIB files to produce the set of SNMP Object Identifiers that represent all applicable IP address occurrences may be a very cumbersome and error prone task.

SUMMARY OF THE INVENTION

Embodiments of the present invention provide method, systems and computer program products for automatically determining Simple Network Management Protocol (SNMP) object identifiers in a Management Information Base (MIB) file that identify Internet Protocol (IP) addresses. An intermediate file may be created that is a representation of the MIB file and contains attribute specific information including the SNMP object identifier for each attribute. All the SNMP object identifiers contained in the intermediate file that identify relevant attribute types may be determined. An output file containing the SNMP object identifiers determined to identify relevant attribute types may be generated. The output file may be consumable by a Comprehensive Network Address Translator (CNAT) product.

In particular embodiments of the present invention, the relevant attribute types include an IP address type attribute and a table-based attribute that is pointed to by an IP address. Furthermore, the SNMP object identifiers determined to identify IP address type attributes may be stored. All attributes contained in a table for table based attributes that are pointed to by an IP address may also be stored and the start position of the IP address used as a pointer in the SNMP object identifier may be determined and stored. If the table-based attribute is pointed to by a plurality of IP addresses, the start position of each of these IP addresses in the SNMP object identifier is determined and stored.

An argument that may identify the MIB file may be received and may be a single MIB file name or a list of MIB file names. The list of files may include both single file names or lists of file names. Errors may be identified in the stored information and if errors are identified generation of an output file may be unnecessary.

The intermediate file may further contain an indication of whether each attribute is a scalar attribute or a table-based attribute and an indication of the Abstract Syntax Notation One (ASN.1) type of each attribute. The ASN.1 attribute type may be at least one of IpAddress, NetworkAddress, and CiscoNetworkAddress.

In further embodiments of the present invention, the output file may comprise a list of all object identifiers that identify IP address type attributes, an indication of the start position of an IP address used as a pointer to a table-based attribute in the SNMP object identifier, and an indication of which values contained in the output file need to be translated. The table-based attribute may be pointed to by a plurality of IP addresses and the start position of each IP address in the SNMP object identifier may also be indicated in the output file.

The MIB file may be a Structure of Management Information (SMI) style MIB file. The MIB file may be located in an SNMP data packet.

DETAILED DESCRIPTION OF THE INVENTION

The present invention now will be described more fully hereinafter with reference to the accompanying drawings, in which illustrative embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As described in more detail below, the present invention provides for generating an output file containing Simple Network Management Protocol (SNMP) Object Identifiers used to identify Internet Protocol (IP) address type attributes within a MIB file. The file may be created using an automated process where MIB files are scanned to locate relevant SNMP object identifiers and these object identifiers are output to a file. The file may be used, for example, by CNAT to locate IP addresses that are contained in an SNMP data packet to be translated.

Figure 1:
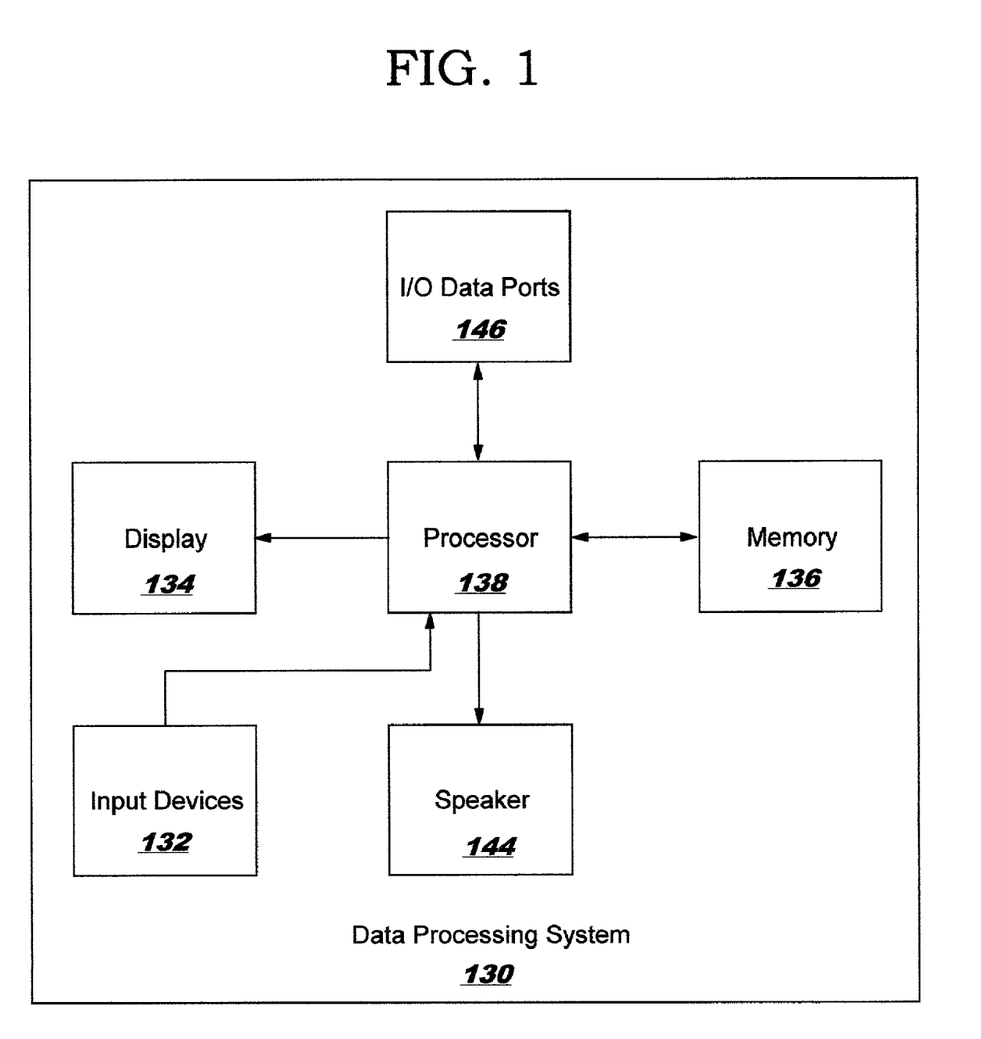
FIG. 1 is a block diagram of a data processing system according to embodiments of the present invention.

Various embodiments of the present invention will now be described with reference to FIGS. 1 through 6. FIG. 1 illustrates an exemplary embodiment of a data processing system 130 in accordance with embodiments of the present invention. A data processing system 130 typically includes input device(s) 132 such as a keyboard or keypad, a display 134, and a memory 136 that communicate wit a processor 138. The data processing system 139 may further include a speaker 144. and an I/O data port(s) 146 that also communicates with the processor 138. The I/O data port 146 can be used to transfer information between the data processing system 130 and another computer system or a network, for example, the Internet. These components may be conventional components such as those used in many conventional data processing systems which may be configured to operate as described herein.

Figure 2:
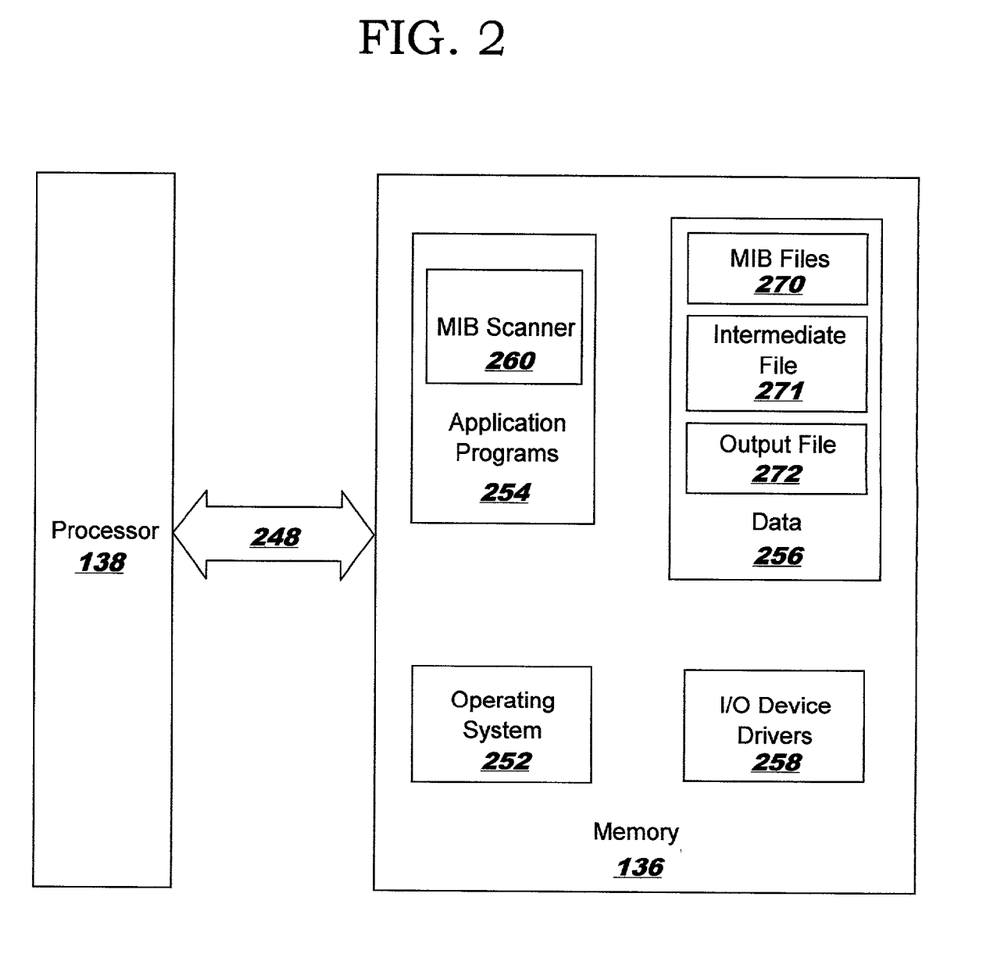
FIG. 2 is a more detailed block diagram of data processing systems according to embodiments of the present invention.

FIG. 2 is a block diagram of embodiments of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux. The I/O device drivers 258 typically include software routines accessed through the operating system 252 by the application program 254 to communicate with devices such as the input devices 132, the display 134, the speaker 144, the I/O data port(s) 146, and certain memory 136 components. The application programs 254 are illustrative of the programs that implement the various features of the data processing system 130 and preferably include at least one application which provides the MIB Scanner aspects of embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 preferably include a MIB Scanner module 260. The MIB Scanner module 260 preferably carries out operations as described herein for scanning MIB files to obtain a list of SNMP object identifiers. Furthermore, the data portion 256 of memory 136 preferably includes one or more MIB files 270 which may be scanned or identify the files which may be scanned. The data portion 256 of memory 236 may also include an intermediate file 271 which may be used to store data during the scanning process and an output file 272 which may include a list of SNMP object identifiers. While element 272 is referred to as a file, those of skill in the art will appreciate that the term file is used for exemplary purposes only and that the structure of the intermediate data is not limited to a file structure. For example, the intermediate data could be stored in some internal data structure, on a disk, or the like.

While the present invention is illustrated, for example, with reference to a MIB Scanner module 260 being an application program, as will be appreciated by those of skill in the art other configurations may also be utilized while still benefiting from the teachings of the present invention. For example, the MIB Scanner module 260 may also be incorporated into the operating system 252 or other such logical division of the data processing system 130. Thus, the present invention should not be construed as limited to the configuration of FIG. 2 but is intended to encompass any configuration capable of carrying out the operations described herein.

Figure 3:
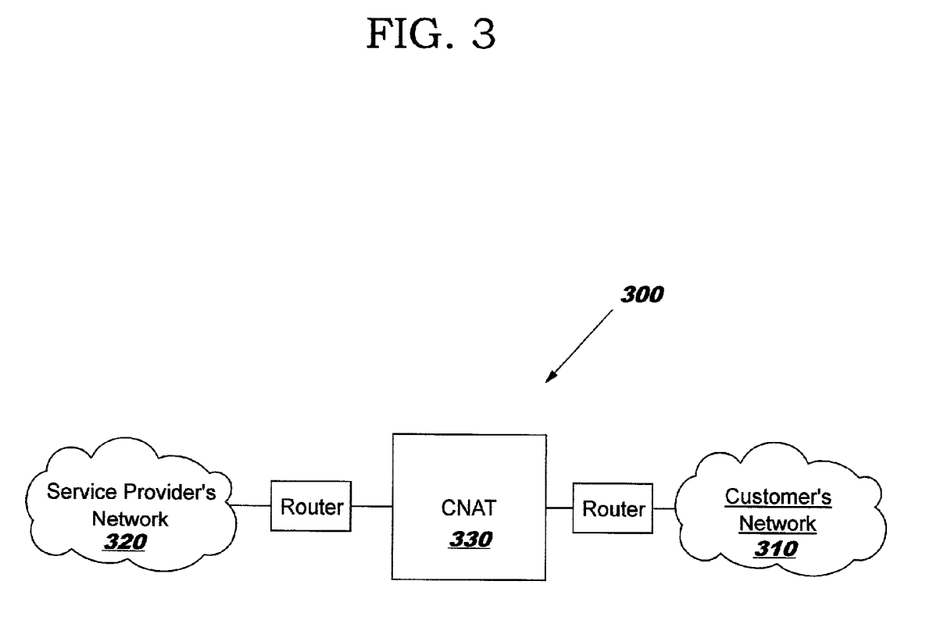
FIG. 3 is a block diagram of a basic network incorporating CNAT according to embodiments of the present invention.

Comprehensive Network Address Translator (CNAT) may provide a monitoring program that may reside at the edge of the network, for example, between the service provider's network and the customer's network as shown in FIG. 3. CNAT may monitor data packets coming through a network device and enable management of conflicting Internet Protocol (IP) address ranges by mapping conflicting addresses into available addresses within the service provider's network. For all data packets routed through the system, CNAT may check the source and destination IP addresses and may translate any conflicting addresses to ensure that no conflicts occur in the destination network. In addition, for certain classes of data packets, for example, Simple Network Management Protocol (SNMP) data packets and Internet Control Message Protocol (ICMP) data packets, CNAT typically scans the contents of the data packet, and translates all values associated with IP address type attributes within the data packets where applicable before forwarding these packets on to their destinations. Attributes are properties of an object or may be considered a container for the properties of the object.

CNAT machines may be integrated into the network topology and may represent the only TCP/IP route from the service provider's network to the customer's network. Integrating CNAT into the network topology typically requires static routes on all routers adjacent to the CNAT node, as well as on the CNAT node itself.

Now referring to FIG. 3, a block diagram illustrating a network 300 incorporating CNAT will be described. A service provider may provide network monitoring and management services to a customer. The IP addresses in the customer's network 310 may overlap with the IP addresses in the service provider's network 320. For data packets flowing from the customer's network 310 to the service provider's network 320, the service provider may use CNAT 330 to translate the customer's IP addresses to different addresses to avoid conflict in the service provider's network 320. Accordingly, CNAT may be used to avoid confusing overlap of IP addresses within SNMP data packets by translating IP addresses found within the data packets to unique IP addresses, i.e. IP addresses not currently assigned. Although the CNAT is shown as physically separate from the routers and the networks in FIG. 3, it will be understood by those having skill in the art that this is for exemplary purposes only and that many configurations may be employed.

The capability to translate IP addresses found within the data packets typically requires the proper identification of the IP addresses that need to be translated and the location of the IP addresses in the data packet. CNAT may use a list of SNMP Object Identifiers (OIDs) to identify an IP address and its location. SNMP is used to communicate management information between network management stations and agents in network elements. An SNMP object identifier is an administratively assigned name of an object which specifies the object type. The SNMP object identifier is typically located within a Management Information Base (MIB). The MIB Scanner according to embodiments of the present invention may be used to create a list of OIDs from a MIB file or list of MIB files that may be used, for example, by CNAT to locate the IP addresses within the SNMP data packets that need to be translated.

Figure 4:
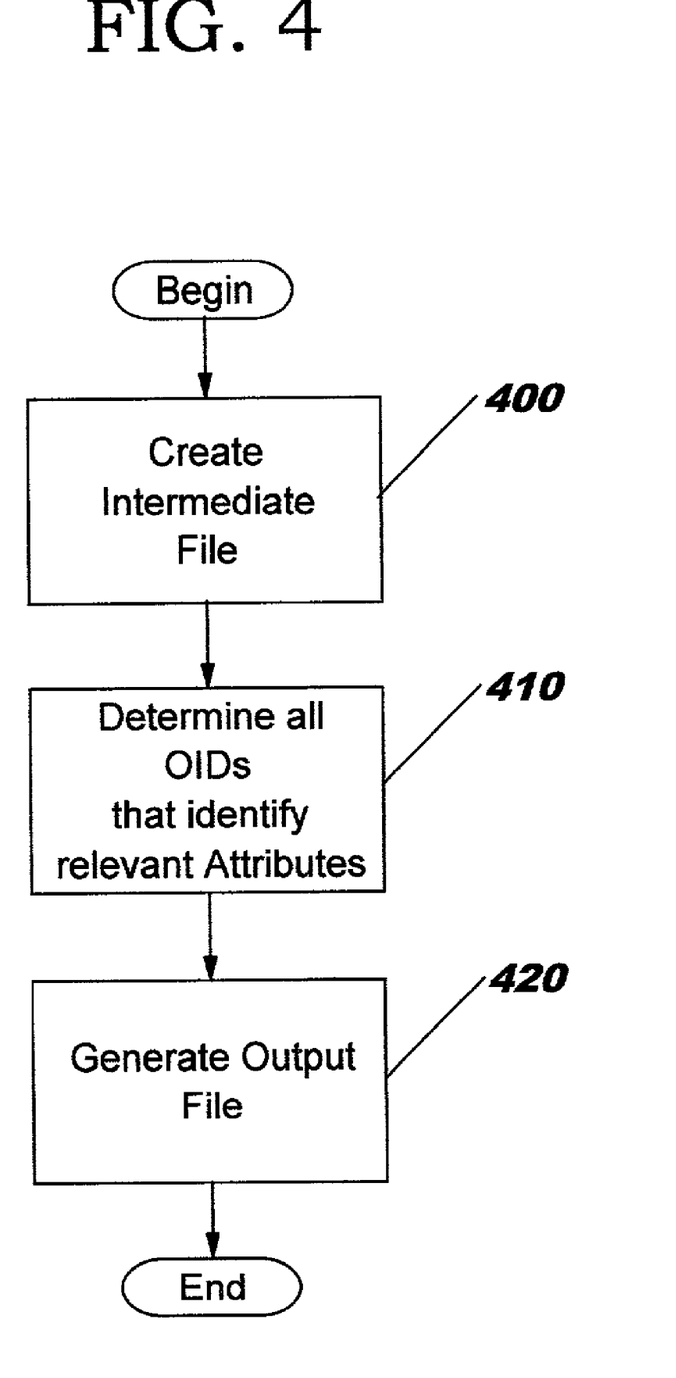
FIG. 4 is a flowchart illustrating operations of a MIB Scanner according to embodiments of the present invention.
Figure 5:
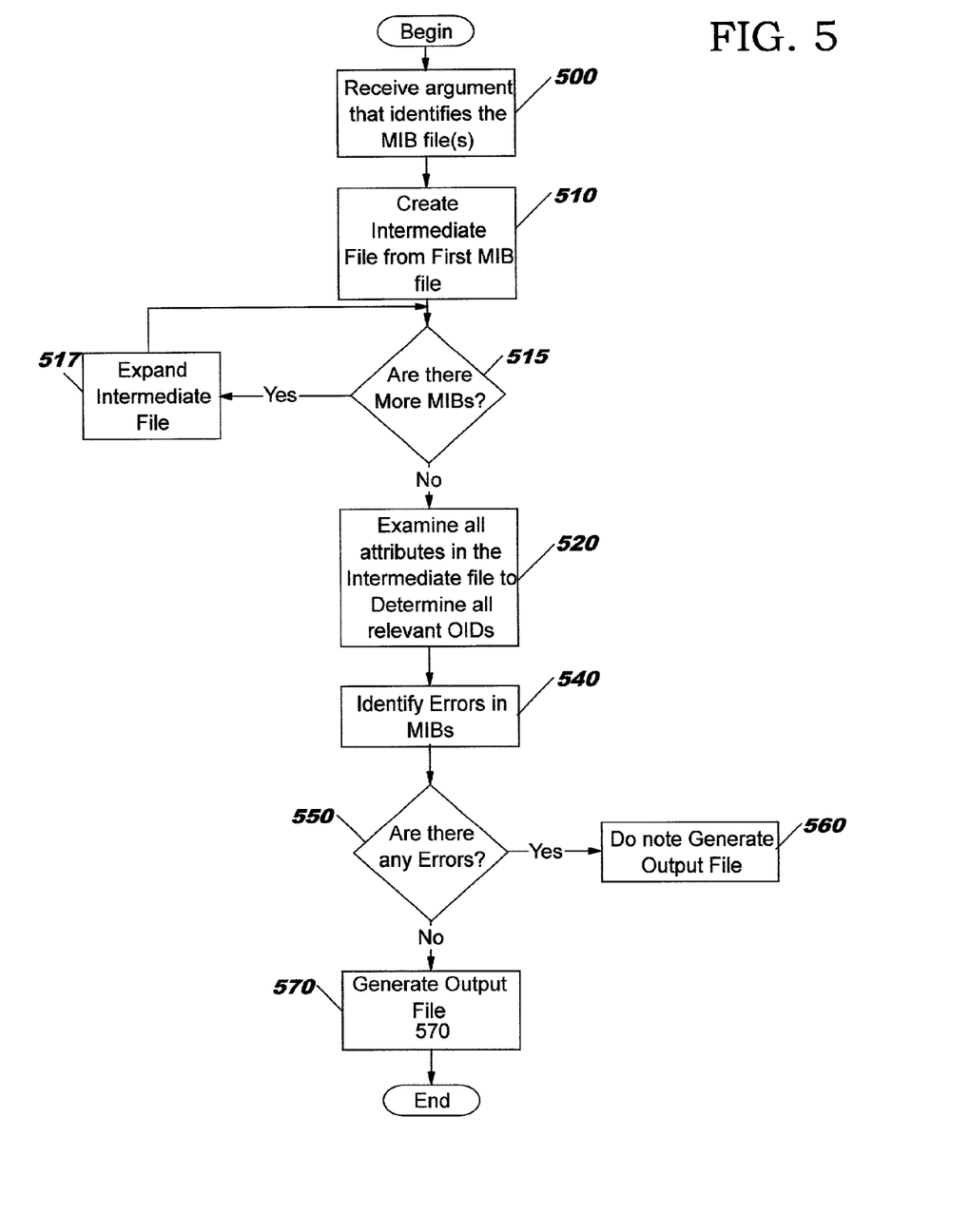
FIG. 5 is a more detailed flowchart illustrating operations of a MIB Scanner according to embodiments of the present invention.
Figure 6:
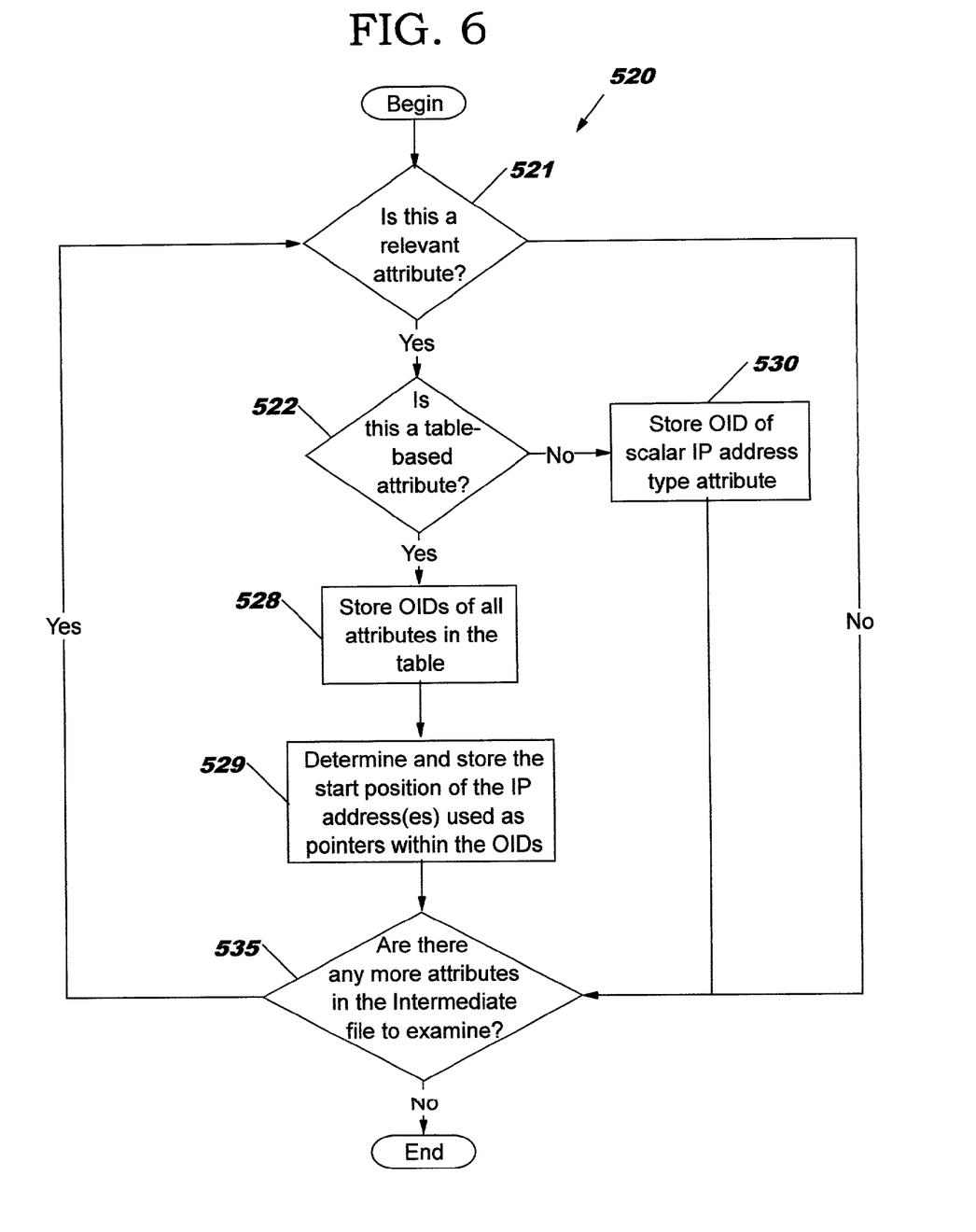
FIG. 6 is a flowchart illustrating operations of examining all attributes in an intermediate file created by the MIB Scanner according to embodiments of the present invention.

Embodiments of the present invention will now be described in more detail with reference to FIGS. 4, 5, and 6 which are flowchart illustrations of operations carried out by a MIB Scanner according to embodiments of the present invention. As seen in FIG. 4, an intermediate file is created (block 400). As discussed above, the term file is not meant to limit the structure of the intermediate data, for example, the intermediate data could be stored in some internal data structure, on a disk, or the like. The MIB Scanner receives one argument, which may point to a MIB file or a MIB list file. A MIB list file may contain the name of one or more MIB files and/or the name of one or more MIB list files. The intermediate file may be a representation of the MIB file after the MIB file has been read and examined in detail. This intermediate file may contain attribute specific information of all the attributes found in the MIB file. As stated above, attributes are properties of an object or may be considered a container for the properties of the object.

This attribute specific information may include whether the attribute is scalar or table-based, in other words, whether or not the attribute is located in a table. The intermediate file may further include the SNMP object identifier that uniquely identifies each attribute and the attributes Abstract Syntax Notation One (ASN.1) type. If the argument points to more than one MIB file, the intermediate file is typically expanded to include the information contained in all the MIB files pointed to by the argument. In particular embodiments of the present invention, the MIB Scanner may be capable of scanning both Structure of Management Information (SMI) version 1 and 2 MIB files.

The MIB Scanner application is typically programmed to recognize ASN.1 attribute types IpAddress and NetworkAddress in the MIB file. Abstract Syntax Notation One (ASN.1) is the language used by Open Systems Interconnection (OSI) protocols for describing abstract syntax. This language is also used to encode SNMP packets. The MIB Scanner may also be programmed to recognize additional vendor specific attribute types, for example, ASN.1 attribute type CiscoNetworkAddress, by specifying these attribute types in a attribute file that is consumable by the MIB Scanner application.

Referring again to FIG. 4, once the intermediate file is complete the MIB Scanner determines which of the SNMP object identifiers in the intermediate file identify relevant attributes (block 410), for example, including IP address type attributes and table-based attributes pointed to by IP addresses. When an IP address type attribute is identified in the intermediate file, the MIB scanner typically determines if the IP address type attribute is scalar or table-based. If the IP address type attribute is determined to be a scalar attribute the SNMP object identifier related to the IP address type attribute may be stored in a data structure. This structure may be located in the data portion 256 of the memory 136 shown in FIG. 2. If the IP address type attribute is determined to be a table-based attribute that is pointed to by an IP address, as opposed to a scalar IP address type attribute, all the attributes in the table may be stored in the data structure and a start position of the IP address in the SNMP object identifier is typically established.

Once the intermediate file has been completely examined and all relevant SNMP object identifiers have been identified, an output file may be generated (block 420). This output file may include a list of SNMP object identifiers that identify attributes that are IP addresses, an indication of the start position of the IP address in the SNMP object identifier if the attribute is a table-based attribute, and an indication of whether or not the value in the output file needs network address translation such as that provided by CNAT. If the attribute happens to be a table-based attribute and the attribute is pointed to by one or more IP addresses, then all the attributes contained in that table are included in the output file. If the table-based attribute is pointed to by multiple IP addresses the output file may contain an indication of the start positions of up to four of the IP addresses in the SNMP object identifier.

The indication of whether or not the value in the output file needs network address translation may be indicated by the notation of "-T" in the output file at the end of the SNMP object identifier. For example, the output line might be object identifier -T, or in the case of the object identifier 1.3.6.1.2.4.1.1.5, the output line would be 1.3.6.1.2.4.1.1.5 -T.

Now referring to FIG. 5, a flow chart illustrating operations of other embodiments of the MIB Scanner will be described. The MIB Scanner receives an argument that may identify the MIB file or files to be scanned (block 500). As discussed above, the argument may point to a MIB file or a MIB list file that typically contains the names of one or more MIB files and/or MIB list files. After the MIB Scanner receives the argument and identifies the MIB files to be scanned, it creates an intermediate file as discussed above including information from the first MIB file it sees (block 510).

After the intermediate file is created for the first MIB file, it is determined if more MIB files are present and need to be scanned (block 515). If more MIB files are present, the next MIB file is read and examined as described above. The intermediate file is then expanded to include the information obtained from the second MIB file (block 517). Operations then return to block 515 and the process repeats until there are no more MIB files to read and examine, i.e. every MIB file identified by the argument has been scanned and the intermediate file expanded to incorporate the information from all the MIB files. Accordingly, since the MIB Scanner operates in this recursive manner, the MIB files may be listed in any order within a MIB list file.

If, on the other hand, it is determined there are no more MIB files present that need to be scanned (block 515), the attributes in the intermediate file are examined to determine all relevant SNMP object identifiers that should be included in the output file (block 520). Operations for such identification according to particular embodiments of the present invention are discussed in more detail with reference to FIG. 6.

After all the attributes are examined to determine the relevant SNMP object identifiers, for example, the SNMP object identifiers for IP address type attributes, and this information is stored, the stored object identifiers are examined for errors (block 540). If the stored information is determined to contain errors (block 550), an output file typically will not be generated (block 560). Typically, the errors must be resolved before the MIB Scanner will generate an output file, this prevents the possibility of creating a partial list of SNMP object identifiers. These errors may be caused by the format of the MIB file itself and/or missing MIB files. Errors associated with the format of the MIB file may be referred to as syntax errors. The MIB Scanner may access external MIB files or "import files" from an external source. Errors associated with missing files are referred to as IMPORT errors because it typically indicates that a prerequisite MIB was not in the directory or directories where the MIB Scanner was instructed to look for the files. This could be caused by many things, including providing an incorrect path or failing to list a MIB file in the MIB list file. If the stored information is determined not to contain errors (block 550), then the MIB Scanner may generate the output file utilizing the stored information as discussed above with reference to FIG. 4 (block 420).

Now referring to FIG. 6, a flowchart illustrating operations of block 520 of FIG. 5 for examining all attributes in an intermediate file according to particular embodiments of the present invention will be described in more detail. After all the MIB files have been read and examined and the intermediate file is complete, the attributes in the intermediate file are examined to determine all relevant SNMP object identifiers (block 520 of FIG. 5). The ASN.1 type of each attribute included in the intermediate file may be used to identify the relevant attributes within the intermediate file (block 521). For example, assume the MIB Scanner application is programmed to identify IP address type attributes IpAddress, NetworkAddress, and CiscoNetworkAddress. The MIB Scanner, as discussed above, creates an intermediate file that contains attribute specific information including the ASN.1 type of each attribute. The MIB Scanner may then scan through the intermediate file for attributes having one of the three ASN.1 attribute types specified above. Once these attributes have been recognized, the MIB Scanner may determine whether these relevant attributes are either scalar or table-based as discussed below.

Once a relevant IP address type attribute, for example, an ASN.1 IpAddress type attribute, is identified in the intermediate file, the MIB scanner typically determines if the relevant IP address type attribute is a table-based attribute or a scalar attribute (block 522). Such a determination may be made by the MIB scanner based on the definition of the attribute as defined in the relevant MIB file. Every attribute has a definition and this definition may contain a plurality of fields. These fields might include an object type field, a syntax field, a description field and an index field. ASN.1 language is used to define many of these fields. The object types may be predetermined object types. The syntax of an object type may define the data structure corresponding to that particular object type. For example, the syntax of an IP address type attribute might be IpAddress, NetworkAddress, CiscoNetworkAddress or the like. The description field may contain a description of the object type and its function. For example, object type ipRouteEntry with a corresponding syntax of IpRouteEntry may have a description that reads "A route to a particular destination". Furthermore, object type ipRouteEntry may have an index which may specify where this particular object type is located. For example, the index specifier might be {ipRouteDest}::={IpRouteEntry 1}. In other words, the route to a particular destination may be specified by the attribute of the IP routing table. This information included in the definition of each attribute enables the MIB scanner to determine if the attribute is a table-based attribute or a scalar attribute. Referring to the example above, the MIB scanner may determine that this attribute is a table based attribute because of the presence of the index specifier in the overall object type definition.

If it is determined that the attribute being examined is a table-based attribute, every attribute in the table is stored for later use in creating the output file (block 528). The MIB scanner determines a start position of the IP addresses used as pointers in the SNMP object identifier relative to all other pointers in the SNMP object identifier and stores this start position for later use in creating the output file (block 529). An object identifier is a sequence of integers and each of these integers has an assigned significance. For example, in a MIB file the object identifier for the first attribute in an IP Address Table might be 1.3.6.1.2.1.4.20.1.1.IP address. The start position of the IP addresses used as pointers in the SNMP object identifier may be indicated in the output file. For example, an entry in the output file may be 1.3.6.1.2.1.4.20.1.1 -I 11. This may indicate that the IP address is used as a pointer (index) into a table starting at the 11$^{th}$ digit of the object identifier. As discussed above, a table-based attribute may be referenced by several IP addresses. If this is the case, the MIB Scanner may identify up to four start positions of IP addresses within a single object identifier by using multiple -I values in the output file.

Returning to FIG. 6, it is determined if another attribute exists in the intermediate file that needs to be examined (block 535). If another attribute does exist, operations return to block 521 and the process repeats until there are no more attributes left in the intermediate file that need to be examined.

Returning to block 522, if the relevant attribute is not a table-based attribute, it is a scalar IP address type attribute. For example, the fields of a scalar attribute definition might be object type sysLocation with a corresponding syntax of DisplayString (SIZE (0.255)), a description that states "The physical location of this node (e.g., telephone closet, 3$^{rd}$ floor)". If the attribute is determined to be a scalar IP address type attribute based on the definition of the attribute located in the MIB file, then its SNMP object identifier (OID) may be relevant and may be stored for later use in creating the output file (block 530). It is also determined if another attribute exists in the intermediate file that needs to examined (block 535). If another attribute does exist, operations return to block 521 and the process repeats until there are no more attributes left in the intermediate file that need to be examined.

The flowcharts and block diagrams of FIGS. 1 through 6 illustrate the architecture, functionality, and operation of possible implementations of systems, methods and computer program products for obtaining a list of SNMP object identifiers according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of determining Simple Network Management Protocol (SNMP) object identifiers in a Management Information Base (MIB) file that identify Internet Protocol (IP) addresses, comprising the steps of:

creating an intermediate file that is a representation of the MIB file containing attribute specific information including the SNMP object identifier for each attribute;

determining all the SNMP object identifiers contained in the intermediate file that identify relevant attribute types; and generating an output file containing the SNMP object identifiers determined to identify the relevant attribute types, wherein the relevant attribute types include an IP address type attribute and/or a table-based attribute that is pointed to by an IP address, wherein the determining step further comprises the steps of:

storing the SNMP object identifiers determined to identify IP address type attributes;

storing all attributes contained in a table for table-based attributes that are pointed to by an IP address; and determining and storing a start position of the IP address used as a pointer in the SNMP object identifier.

2. The method of claim 1, wherein the step of determining and storing the start position further comprises the steps of:

determining if a table-based attribute is pointed to by a plurality of IP addresses; and determining the start position of each of the plurality of IP addresses in the SNMP object identifier of the table-based attribute.

3. The method of claim 2 further comprising the step of identifying errors in the stored SNMP object identifier and table-based attributes, so as to not create the output file if errors are identified.

4. The method of claim 1, wherein the intermediate file further contains:

an indication of whether each attribute is a scalar attribute or a table-based attribute; and an indication of the Abstract Syntax Notation One (ASN.1) of each attribute.

5. The method of claim 4, wherein the ASN.1 attribute type is at least one of IpAddress, NetworkAddress, and CiscoNetworkAddress.

6. The method of claim 1, wherein the MIB file is a Structure of Management Information (SMI) version 1 style MIB file.

7. The method of claim 1, wherein the MIB file is a Structure of Management Information (SMI) version 2 style MIB file.

8. The method of claim 1, wherein the attributes are located in an SNMP data packet.

9. The method of claim 1 further comprising the step of receiving an argument that identifies the MIB file, wherein the argument is at least one of a single file name and a list of file names.

10. The method of claim 9 wherein the step of receiving an argument further comprises the step of determining if the argument is a list of file names; and wherein the step of creating an intermediate file comprises creating an intermediate file containing attribute specific information of all files in the list of file names if the argument is a list of file names.

11. The method of claim 10, wherein the list of file names comprises at least one of a plurality of single file names or a plurality of lists of file names.

12. The method of claim 1, wherein the output file is consumable by a Comprehensive Network Address Translator (CNAT) product.

13. A method of determining Simple Network Management Protocol (SNMP) object identifiers in a Management Information Base (MIB) file that identify Internet Protocol (IP) addresses, comprising the steps of:
creating an intermediate file that is a representation of the MIB file containing attribute specific information including the SNMP object identifier for each attribute;
determining all the SNMP object identifiers contained in the intermediate file that identify relevant attribute types; and
generating an output file containing the SNMP object identifiers determined to identify the relevant attribute types, wherein the relevant attribute types include an IP address type attribute and/or a table-based attribute that is pointed to by an IP address,
wherein the step of generating an output file comprises the steps of:
storing a list of all object identifiers that identify IP address type attributes in the output file;
storing an indication of a start position of an IP address used as a pointer to a table-based attribute in a corresponding SNMP object identifier in the output file; and
storing an indication of which values contained in the output file need to be translated.

14. The method of claim 13, wherein the table-based attribute is pointed to by a plurality of IP addresses and wherein the step of storing an indication of a start position comprises storing an indication of a start position for each IP address in a corresponding SNMP object identifier in the output file.

15. The method of claim 14, wherein the plurality of IP addresses comprises at most four IP addresses.

16. A system for determining Simple Network Management Protocol (SNMP) object identifiers in a Management Information Base (MIB) file that identify Internet Protocol (IP) addresses, comprising:
means for creating an intermediate file that is a representation of the MIB file containing attribute specific information including the SNMP object identifier for each attribute;
means for determining all the SNMP object identifiers contained in the intermediate file that identify relevant attribute types; and
means for generating an output file containing the SNMP abject identifiers determined to identify the relevant attribute types, wherein the relevant attribute types include an IP address type attribute and/or a table-based attribute that is pointed to by an IP address, wherein the means for determining further comprises:
means for storing the SNMP object identifiers determined to identify IP address type attributes; and
means for storing all attributes contained in a table for table-based attributes that are pointed to by an IP address; and
means for determining and storing a start position of the IP address used as a pointer in the SNMP object identifier.

17. The system of claim 16, wherein the means for determining and storing the start position further comprises:
means for determining if a table-based attribute is pointed to by a plurality of IP addresses; and
means for determining the start position of each of the plurality of IP addresses in the SNMP object identifier of the table-based attribute.

18. The system of claim 17 further comprising means for identifying errors in the stored SNMP object identifier and table-based attributes, so as to not create the output file if errors are identified.

19. The system of claim 16, wherein the intermediate file further contains:
an indication of whether each attribute is a scalar attribute or a table-based attribute; and
an indication of the Abstract Syntax Notation One (ASN.1) type of each attribute.

20. The system of claim 19, wherein the ASN.1 attribute type is at least one of IpAddress, NetworkAddress, and CiscoNetworkAddress.

21. The system of claim 16, wherein the MIB file is a Structure of Management Information (SMI) version 1 style MIB file.

22. The system of claim 16, wherein the MIB file is a Structure of Management Information (SMI) version 2 style MIB file.

23. The system of claim 16, wherein the attributes are located in an SNMP data packet.

24. The system of claim 16 further comprising:
means for receiving an argument that identifies the MIB file, wherein the argument is at least one of a single file name or a list of file names.

25. The system of claim 24 wherein the means for receiving an argument further comprises means for determining if the argument is a list of files; and
the means for creating an intermediate file comprises means for creating an intermediate file containing attribute specific information of all the files in the list of file names if the argument is a list of file names.

26. The system of claim 25, wherein the list of file names comprises at least one of a plurality of single file names or a plurality of lists of file names.

27. The system of claim 16, wherein the output file is consumable by a Comprehensive Network Address Translator (CNAT) product.

28. A system for determining Simple Network Management Protocol (SNMP) object identifiers in a Management Information Base (MIB) file that identify Internet Protocol (IP) addresses, comprising:
means for creating an intermediate file that is a representation of the MIB file containing attribute specific information including the SNMP object identifier for each attribute;
means for determining all the SNMP object identifiers contained in the intermediate file that identify relevant attribute types; and
means for generating an outpout file containing the SNMP object identifiers determined to identify the relevant attribute types, wherein the relevant attribute types include an IP address type attribute and/or a table-based attribute that is pointed to by an IP address, wherein the means for generating the output file comprises:
means for storing a list of all object identifiers that identify IP address type attributes in the output file;

means for storing an indication of a start position of an IP address used as a pointer to a table-based attribute in a corresponding SNMP object identifier in the output file; and means for storing an indication of which values contained in the output file need to be translated.

29. The system of claim 28, wherein the table-based attribute is pointed to by a plurality of IP addresses and wherein the means for storing an indication of a start position comprises means for storing an indication of a start position for each IP address in a corresponding SNMP object identifier in the output file.

30. The system of claim 29, wherein the plurality of IP addresses comprises at most four IP addresses.

31. A computer program product for determining Simple Network Management Protocol (SNMP) object identifiers in a Management Information Base (MIB) file that identify Internet Protocol IP) addresses, comprising:

a computer readable program medium having computer readable program code embodied therein, the computer readable program code comprising:

computer readable program code which creates an intermediate file that is a representation of the MIB file containing attribute specific information including the SNMP object identifier for each attribute;

computer readable program code which determines all the SNMP object identifiers contained in the intermediate file that identify relevant attribute types; and computer readable program code which generates an output file containing the SNMP object identifiers determined to identify the relevant attribute types, wherein the relevant attribute types include an IP address type attribute and/or a table-based attribute that is pointed to by an IP address, wherein computer readable program code which determines comprises:

computer readable code which stores the SNMP object identifiers determined to identify IP address type attributes; and computer readable program code which stores all attributes contained in a table for table-based attributes that are pointed to by an IP address; and computer readable program code which determines and stores a start position of the IP address used as a pointer in the SNMP object identifier.

32. The computer program product of claim 31, wherein the computer readable code that determines and stores the start position further comprises:

computer readable program code which determines if a table-based attribute is pointed to by a plurality of IP addresses; and computer readable program code which determines the start position of each of the plurality of IP addresses in the SNMP object identifier of the table-based attribute.

33. The computer program product of claim 31 further comprising computer readable program code which identifies errors in the stored SNMP object identifier and table-based attributes, so as to not create the output file if errors are identified.

34. The computer program product of claim 31, wherein the intermediate file further contains:

an indication of whether each attribute is a scalar attribute or a table-based attribute; and an indication of the Abstract Syntax Notation One (ASN.1) type of each attribute.

35. The computer program product of claim 34, wherein the ASN.1 attribute type is at least one of IpAddress, NetworkAddress, and CiscoNetworkAddress.

36. The computer program product of claim 31, wherein the MIB file is a Structure of Management Information (SMI) version 1 style MIB file.

37. The computer program product of claim 31, wherein the MIB file is a Structure of Management Information (SMI) version 2 style MIB file.

38. The computer program product of claim 31, wherein the MIB file is located in an SNMP data packet.

39. The computer program product of claim 31, further comprising computer readable program code which receives an argument that identifies the MIB file, wherein the argument is at least one of a single file name and a list file names.

40. The computer program product of claim 39, wherein the computer readable program code which receives an argument further comprises computer readable program code which determines if the argument is a list of files; and the computer readable program code which creates an intermediate file comprises computer readable program code which creates an intermediate file containing attribute specific information of all the files in the list of file names if the argument is a list of file names.

41. The computer program product of claim 40, wherein the list of file names comprises at least one of a plurality of single file names or a plurality of lists of file names.

42. The computer program product of claim 31, wherein the output file is consumable by a Comprehensive Network Address Translator (CNAT) product.

43. A computer program product for determining Simple Network Management Protocol (SNMP) object identifiers in a Management Information Base (MIB) file that identify Internet Protocol (IP) addresses, comprising:

a computer readable program medium having computer readable program code embodied therein, the computer readable program code comprising:

computer readable program code which creates an intermediate file that is a representation of the MIB file containing attribute specific information including the SNMP object identifier for each attribute;

computer readable program code which determines all the SNMP object identifiers contained in the intermediate file that identify relevant attribute types; and computer readable program code which generates an output file containing the SNMP object identifiers determined to identify the relevant attribute types, wherein the relevant attribute types include an IP address type attribute and/or a table-based attribute that is pointed to by an IP address, wherein the computer readable program code which generates the output file comprises:

computer readable program code which stores a list of all object identifiers that identify IP address type attributes in the output file;

computer readable program code which stores an indication of the start position of an IP address used as a pointer to a table-based attribute in the SNMP object identifier in the output file; and computer readable program code which stores an indication of which values contained in the output file need to be translated.

44. The computer program product of claim 43, wherein the table-based attribute is pointed to by a plurality of IP addresses and wherein the computer readable program code which stores an indication of a start position comprises computer readable program code which stores an indication of a start position for each IP address in a corresponding SNMP object identifier in the output file.

45. The computer program product of claim 44, wherein the plurality of IP addresses comprises at most four IP addresses.

* * * * *